United States Patent [19]

Shaw et al.

[11] Patent Number: 4,461,574
[45] Date of Patent: Jul. 24, 1984

[54] ENVIRONMENTALLY INDEPENDENT FIBER OPTIC ROTATION SENSOR

[75] Inventors: Herbert J. Shaw, Stamford, Calif.; Herve J. Arditty, Le Chesnay, France

[73] Assignee: The United States of America as represented by the Secretary of the Air Force, Washington, D.C.

[21] Appl. No.: 105,043

[22] Filed: Dec. 18, 1979

[51] Int. Cl.$^3$ .............................. G01C 19/64
[52] U.S. Cl. .............................. 356/350
[58] Field of Search .............. 356/350; 250/227

[56] References Cited

U.S. PATENT DOCUMENTS

| 4,259,016 | 3/1981 | Schiffner | 356/351 |
| 4,280,766 | 6/1981 | Goss et al. | 356/350 |
| 4,302,107 | 11/1981 | Schiffner et al. | 356/350 |

FOREIGN PATENT DOCUMENTS 1807247  5/1970  Fed. Rep. of Germany ...... 356/350

OTHER PUBLICATIONS

Gambling, W. A., "Birefringence and Optical Activity in Single-Mode Fibres", *Optical Fiber Transmission II*; Jun. 1977.
Steinberg, R. A., et al., "Performance Limitations Imposed on Optical Waveguide Switches and Modulators by Polarization" *Applied Optics* vol. 15, No. 10, 1976.
Vali et al., "Fiber Ring Interferometer" Applied Optics vol. 15, No. 5 May 1976.
Arditty, H., "Re-Entrant Fiberoptic Approach to Rotation Sensing" Spie vol. 157, Laser Inertial Rotation Sensors.
Simon, A., et al., "Evolution of Polarization Along a Single-Mode Fiber", Applied Physics Letters, vol. 31, No. 8, Oct. 15, 1977, pp. 517-520.

*Primary Examiner*—Bruce Y. Arnold
*Attorney, Agent, or Firm*—Donald J. Singer; Jacob N. Erlich

[57] ABSTRACT

An environmentally independent fiber optic rotation sensor having a polarizer or polarization filter interposed between each beam coupler and the beamsplitter of the rotation sensor. The polarizers permit the passing of the polarization of the beams therethrough while rejecting the cross-polarized waves of the beams thereby causing a co-polarized mode of operation to take place. As a result of the co-polarized mode of operation the rotation sensor is unaffected by the surrounding environmental conditions. However, in so doing, the rotation sensor is subject to spurious fringe patterns which take place at the fiber ends. Elimination of these fringe patterns take place at the input side of the rotation sensor rather than at the output side in order to produce satisfactory rotation sensing.

9 Claims, 2 Drawing Figures

ENVIRONMENTALLY INDEPENDENT FIBER OPTIC ROTATION SENSOR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to fiber optic rotation sensors, and, more particularly to a fiber optic rotation sensor which is relatively unaffected by the environmental conditions surrounding it.

In the fields encompassing navigation, guidance and geophysical measurement, conventional gyroscopes leave much to be desired in their sensitivity in the measurement of rotation rates. In recent years, however, a dramatic development has taken place in optical technology with the invention of the laser gyroscope which is an example of a rotation sensor based on the Sagnac effect. The laser gyroscope combines the properties of the optical oscillator, the laser and general relativity to produce an integrating rate gyroscope. A good description of a laser gyroscope can be found in U.S. Pat. No. 4,013,365.

As pointed out in U.S. Pat. No. 4,013,365, the conventional laser gyroscope is a laser that has three or more reflectors arranged to enclose an area. The three reflectors, preferably mirrors, together with the light-amplifying material in the laser path, comprise an oscillator. In fact, there are two oscillators, one that has energy traveling clockwise and one that has energy traveling counterclockwise around the same physical cavity. The frequencies at which these oscillators operate are determined by the optical path length of the cavity they travel. In order to sustain oscillation, two conditions must be met: (1) the gain must equal to unity at some power level set by the amplifying medium, and (2) the number of wavelengths in the cavity must be an exact integer. If the first condition is to be achieved, the laser frequency must be such that the amplifying medium has sufficient gain to overcome the losses at the reflectors and the other elements in the laser path. In addition, the wavelength must be an exact integer for the path around the cavity. This last condition actually determines the oscillation frequency of the laser.

When the enclosed ring is rotated in inertial space the clockwise and counterclockwise paths have different lengths. The path difference in these two directions causes the two oscillators to operate at different frequencies. The difference is proportional to the rate at which the ring is rotating since path difference is proportional to inertial rotation rate. The readout of the gyroscope is accomplished by monitoring the frequency difference between the two oscillators.

Another rotation sensing device based on the Sagnac effect is the fiber ring interferometer of the type described in a publication by V. Vali and R. W. Shorthill in Applied Optics, Volume 15, No. 5, May 1976, pgs 1099 and 1100 in which a multi-turn fiber optic ring is used to increase the sensitivity of the device over earlier version of the Sagnac interferometer.

Even further substantially increasing the sensitivity of the fiber optic ring interferometer is the fiber optic rotation sensing interferometer of the type set forth in application Ser. No. 100,320, filed Dec. 5, 1979, now U.S. Pat. No. 4,323,310 issued Apr. 6, 1982, by Shaw et al, one of the inventors of this invention.

During utilization of the fiber optic rotation sensing interferometers of the past it was realized by the inventors of this invention that an important consideration in the practical operation of fiber optic interferometers for accurate rotation sensing at low rates is the fact that these interferometers or rotation sensors are environmentally sensitive. In other words, changes in temperature or strain in the fiber optic loop itself can result directly in errors in the measurement of rotation rates. Unless proper precautions are undertaken, optical non-reciprocity can occur in the optic fiber loop which renders the system environmentally sensitive. Consequently, it is essential in the utilization of fiber optic rotation sensors to eliminate this undesirable factor of environmental sensitivity.

SUMMARY OF THE INVENTION

The fiber optics rotation sensor of this invention overcomes the problems set forth in detail hereinabove by providing for a fiber optic rotation sensor which is relatively insensitive to surrounding environmental conditions.

The inventors have recognized that a basic consideration in the practical operation of fiber optic sensors for accurate rotation sensing at low rates is reciprocity in the rotation sensing loop. Under this principal, non-reciprocity in the operation of the loop renders the system environmentally sensitive, such that changes in temperature or strain in the fiber result directly in errors in the measurements of rotation rate. This refers to an environmental dependence of the basic Sagnac differential phase shift which is used as a measure of the rotation rate, and not to a simple systematic dependence of scale factor on temperature.

Generally, rotation sensing fiber optic sensors of the past have been operated without any control of relative polarization between input and output optical channels or with cross polarized input and output optical channels. These types of operations, it has been recognized by the inventors, are inherently sensitive to the surrounding environmental conditions. The utilization of cross polarized operation was attractive because it excludes, from the output, spurious interfering fringe patterns which are produced by reflections from the fiber ends in the input channel. In any system for rotation sensing based on the Sagnac effect it is phase splitting which provides the basic mechanism for measuring rotation rates. In the electrical fringe pattern phase splitting determines the number of fringes between the measured point and the starting point. If a change in phase shift experienced by either the clockwise or counterclockwise waves in the fiber (due to environmental conditions) produces any horizontal shift in location of the fringe pattern, then it can change its fringe count and produce a direct error in the measurement of rotation rate.

In order to overcome the problems of the past, the rotation sensor of this invention is operated in the co-polarized mode. This is accomplished by a conventional polarizer or polarization filter interposed within the electromagnetic beam both entering and leaving each end of the optic fiber loop within a fiber optic rotation sensor of the types, for example, as described in the cited Applied Optics article by Vali et al or U.S. Pat. No. 4,323,310 by Shaw et al. By the utilization of the co-polarized mode of operation as in the instant invention, no spurious shift in the fringe pattern is caused by a twisting of the optical fiber. The only effect is an amplitude change, however, this is unimportant as it need not lead to an error in rotation rate determination. Locations of zero crossings of the sinusoidal fringe pattern, which are the relevant quantities, are independent of amplitude.

In other words, when the fiber optic rotation sensor of this invention is operated in the co-polarized mode, the fiber optic loop behaves as a reciprocal element when the system is at rest, with identical total phase shifts for both clockwise and counterclockwise waves. When cross polarized operation takes place, as in the past, the resting phase shifts are not necessarily equal. The sensors heretofore in use would still be error free if the individual overall phase shift of the two waves were constant. However, in practice this does not occur since these overall phase shifts of the individual waves are strongly environmentally dependent. In fact, the strong phase sensitivity of an optical wave in a fiber to environmental effects is the basis of fiber optic temperature sensors, vibration sensors, strain gauges, acoustic transducers and the like. Consequently, the difference in the overall phase shift of the two waves, which is the quantity sensed in the conventional Sagnac interferometer, is also environmentally sensitive, unless the total phase shifts for both the clockwise and counterclockwise waves are identical.

The above phenomenon results from the fact that a fiber with a circular core is not in actuality a single mode waveguide, even though it can only support waves having a single basic transverse field pattern. It is in actuality a two mode system, in which the two modes are the two orthogonal polarizations of the basic transverse field pattern. It is this fact which leads to the non-reciprocal behavior when the system is improperly operated. The inventors have recognized that in such cases of cross polarizational use, the effects of non-reciprocity are sufficiently severe to render cross polarized operation unsatisfactory for systems designed for extremely high sensitivities and small rotation rates.

Unfortunately in overcoming the problem of environmental sensitivity, the co-polarized mode of operation of the rotation sensor of this invention increases interference from spurious fringe patterns. Therefore, for the rotation sensor of this invention to be properly operable, it is necessary to eliminate the back reflections from the fiber ends. Several approaches to eliminate this problem are possible. Solutions involve the utilization of such techniques as AR coating and liquid index matching. Another relatively simple expedient involves the beveling of the ends of the fiber by an appropriate amount. Although the particular method of removing these reflections may vary, it is essential within the fiber optic rotation sensor of this invention to remove reflections at the input side of the interferometer or sensor rather than the output side.

It is therefore an object of this invention to provide a fiber optic rotation sensor which is capable of providing high sensitivity in the measurement of rotation rates extending down to very low rates.

It is another object of this invention to provide a fiber optic rotation sensor which is independent of the surrounding environmental conditions.

It is still another object of this invention to provide a fiber optic rotation sensor which is economical to produce and which utilizes conventional, currently available components that lend themselves to standard mass producing manufacturing techniques.

For a better understanding of the present invention, together with other and further objects thereof, reference is made to the following description taken in connection with the accompanying drawing and its scope will be pointed out in the appended claims.

DETAILED DESCRIPTION OF THE DRAWING

Figure 1:
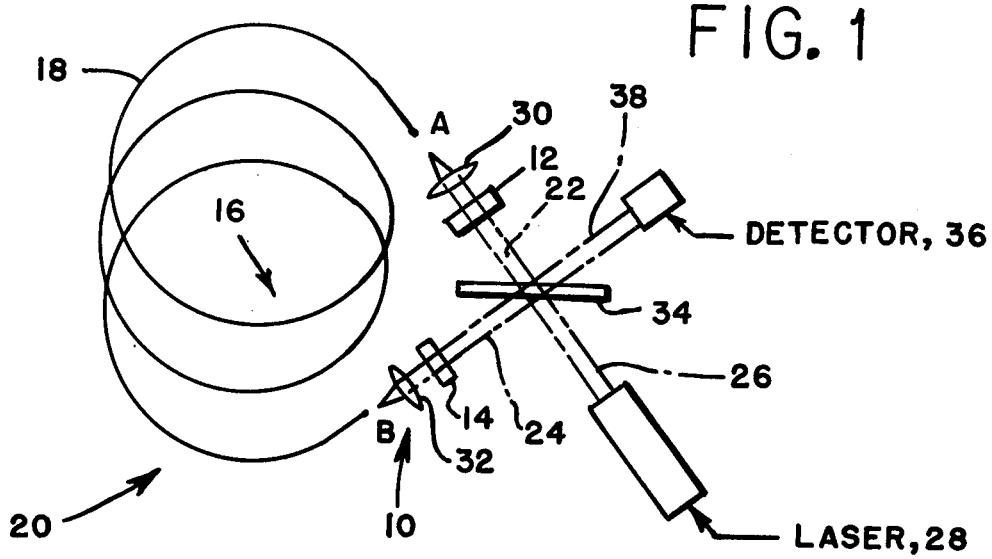
Figure 2:
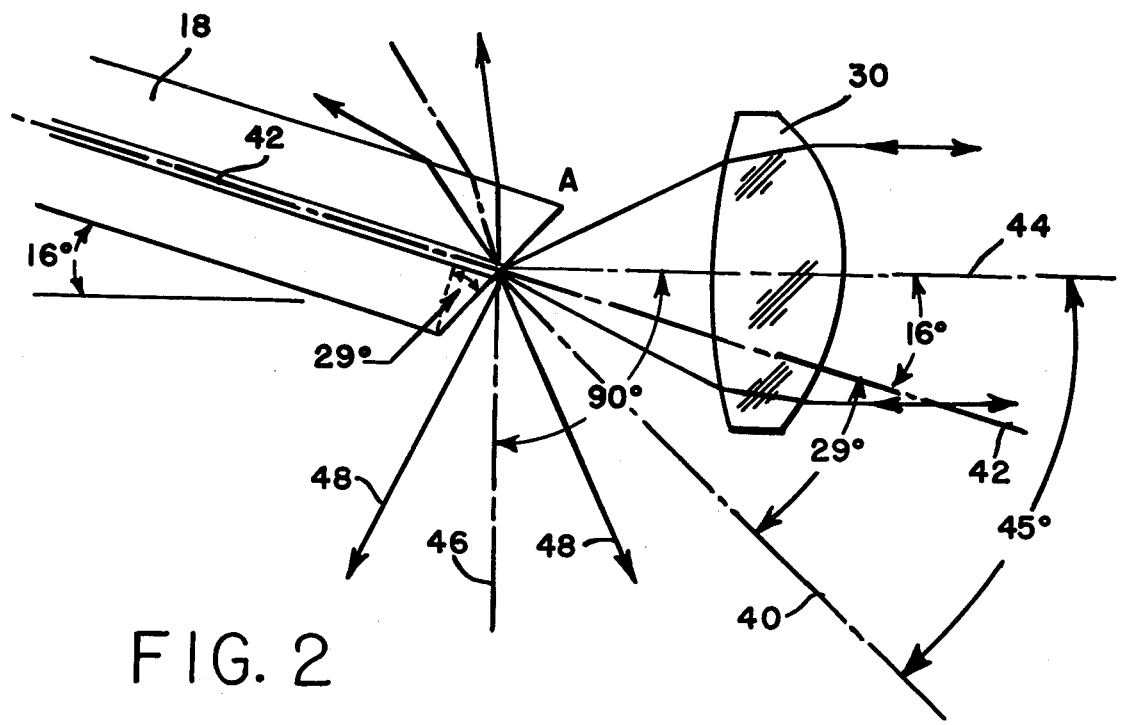

FIG. 1 is a schematic representation of the fiber optic rotation sensor of this invention; and FIG. 2 is an enlarged schematic representation of one end of the fiber optic loop of the fiber optic rotation sensor of this invention.

DETAILED DESCRIPTION OF THE PREFERRED EMBODIMENT

Reference is now made to FIG. 1 of the drawing which schematically illustrates the environmentally independent fiber optic rotation sensor 10 of this invention. Rotation sensor 10 of this invention incorporates therein the main components of any conventional fiber optic rotation sensing interferometer based on the Sagnac effect and of the type described, for example, in the above cited Applied Optics publication. As additional components to the conventional fiber optic rotation sensing interferometer, the rotation sensor 10 of this invention incorporates therein a pair of conventional polarizers or polarization filters 12 and 14 located in a preselected position within the rotation sensor and adjusted to pass identical polarizations as well as means for removing undesirable reflections which are brought about as a result of the co-polarized adjustment of polarizers 12 and 14. Alternatively, a single polarization filter (not shown) could be substituted for polarization filters 12 and 14 in a manner described hereinbelow. The detailed description of the elements involved in the inventive concept of this invention will be set forth in detail hereinbelow.

Still referring to FIG. 1 of the drawing, rotation sensor 10 of this invention is schematically illustrated as being a system having a closed optical path 16 in which mechanical rotation introduces measurable shifts in the phase of the optical signal transversing closed path 16. Path 16 incorporates therein a multiplicity of distinct non-degenerate turns of a conventional optical fiber 18 thereby forming optic loop 20. The ends A and B of optic loop 20 are optically aligned with a pair of beams 22 and 24 of electromagnetic energy derived from a single beam 26 of electromagnetic energy emanating from any conventional electromagnetic source 28 such as conventional Nd; YAG or solid state lasers.

Coupling beams 22 and 24 to the ends A and B, respectively, of optic fiber 18 are a pair of conventional fiber couplers 30 and 32. Couplers 30 and 32 are generally in the form of lenses which enable the electromagnetic beams 22 and 24 to be coupled directly to the fiber optic loop 20. Division of the electromagnetic beam of energy 26 into the pair of beams 22 and 24 from laser 28 is accomplished by means of a conventional four port optical coupler in the form of, for example, a conventional beamsplitter 34 or a fiber optic or micro-optic directional coupler which is optically interposed between electromagnetic source 28 and couplers 30 and 32. Completing rotation sensor 10 is any conventional photodetector 36 which is optically aligned with the output beam 38 of electromagnetic energy from beamsplitter 34.

In the proper sequence of operation, beamsplitter 34 splits input beam 26 into the pair of beams 22 and 24 which are introduced into optical loop 20 by couplers 30 and 32. Beams 22 and 24 circulate in opposite directions about the optical path 16 of the rotation sensor 10 of this invention. A sampled beam 38 is directed to detector 36 by means of beamsplitter 34.

The two beams 22 and 24, in any coincident pair, have a mutual relative phaseshift of $N\Delta\phi_1$ where $\Delta\phi_1$ is the Sagnac phase splitting for one circulation around one turn of loop 20. Detector 36 measures the instantaneous relative phase shift between the two beams and provides an output determinative of the rotation.

In fiber optic rotation sensing interferometer of the type set forth in U.S. Pat. No. 4,323,310 by Shaw et al. the two beams in any coincident pair, have a mutual relative phaseshift of $pN\Delta\phi_1$ where $\Delta\phi_1$ is the Sagnac phase splitting for one circulation around one turn of loop, and p is the number of circulations corresponding to the beam in question. That is, the phase splitting for the pulse pair is $N\Delta\phi_1$ at the one circulation, $2N\Delta\phi_1$ after two circulations, etc. Since for any rotation rate the phase splitting $\Delta\phi$ is now a function of time, the output of detector 36 will also be a function of time. The output of a phase/sensitive detector 36 receiving these beams will contain a term $-c \cos \Delta\phi$ where c is a constant. Thus the output of detector 28 will contain a time sampled cosine waveform, whose envelope is a periodic function of time having a frequency which depends on the rotation rate. The detector measures the instantaneous relative phase shift between the two beams and provides an output determinative of the rotation.

The choice of whether to use two polarizers 12 and 14 as shown in FIG. 1 or a single polarizer (not shown) located in the path of beam 38 is dependent upon the specifics of the optical circuit. For example, in the cases where a fiber optic or micro-optic directional coupler is utilized as the beamsplitter with its terminals connected directly to fiber ends A and B (without lenses) then a single polarizer would be used. When a single polarizer is utilized it is necessary that the beam 26 be polarized.

The inventors have recognized that optic fiber rotation sensors of the past were sensitive to the surrounding environmental conditions wherein the changes in temperature or strain in the optic fiber 18 would result directly in errors in the measurement of rotation rate. This takes place since the environmental dependence of the basic Sagnac differential phase shift is used as a measure of rotation rate and not, for example, a simple systematic detection of scale factor on temperature. Therefore, unless proper precautions are taken, optical non-reciprocity can occur in optical loop 20 which renders the entire system environmentally sensitive.

It is important to point out that the basic circumstance which makes fiber optic rotation sensors operative is that both clockwise and counterclockwise signals transverse exactly the same path. This accounts for the fact that it is possible to form fringe patterns using these waves after they have traversed a length of path far exceeding the coherence length for either one of these waves taken individually. At the same time this circumstance makes it possible for those environmental changes which affect both waves reciprocally to be cancelled out in the output of the system, provided that the polarizations are properly attended to. This can be an important issue because of the very high sensitivity of an optical wave in a fiber to environmental effects.

The reason for the strong environmental sensitivity of an optical wave in a fiber is that very long, low loss, optical paths can be formed using fibers, for which the total phase shift can be extremely large, of the order of $10^9$ cycles per kilometer. Thus, even weak environmental perturbations of the optical propagation velocity can result in large perturbations in phase shift. In a Sagnac interferometer, a rotation sensor for which these perturbations do not completely cancel, they can easily cause instabilities which mask the desired rotation signals. Generally, rotation sensors of the past have been operated in the cross-polarized mode in order to remove interfering fringe patterns, however, this simple and commonly used expedient for removing the interfering fringe patterns renders the system sensitive to environmental effects.

The instant invention sets forth a rotation sensor 10 which overcomes the problems of environmental instability by containing therein a pair of polarization filters, more commonly referred to as polarizers 12 and 14 located between each coupler 30 and 32, respectively, and beamsplitter 34. Polarization filters 12 and 14 pass the polarization of the input laser beams 22 and 24 and reject the cross-polarized waves. Such an operation is referred to as the co-polarized mode of operation and is at the heart of this invention.

In the instant invention, fiber optic rotation sensor 10 operates in the co-polarized mode with loop 20 behaving as a reciprocal element, with identical phase shifts for both clockwise and counterclockwise waves when rotation sensor 10 is at rest. In the cross-polarized mode of operation, as in the past, the resting phase shifts are not necessarily equal. As a result, the difference in the overall phase shift of these two waves, which is a quantity sensed in rotation sensing interferometers based on the Sagnac effect, is environmentally sensitive. This phenomena results from the fact that a fiber with a circular core is not really a single mode waveguide even thought it can only support waves having a single basic transverse field pattern. In actuality it is a two mode system in which the two modes are two orthogonal polarizations of the basic transverse field pattern. It is this fact which leads to the non-reciprocal behavior of the system when it is improperly operated.

Unfortunately, in the co-polarized mode of operation which eliminates this environmental sensitivity, as with rotation sensor 10 of this invention, spurious fringe patterns are not eliminated. To operate the instant invention without interference from such spurious fringe patterns it is necessary to eliminate back reflections from the ends A and B of fiber 18. This is a relatively minor consideration, but nevertheless constitutes a design complication representing a price which must be paid for system stability. In order to overcome this problem, rotation sensor 10 is capable of utilizing therein some of the readily available solutions to the problem in the form of such techniques as AR coating and liquid index matching. Another relatively simple expedient involves beveling the ends A and B of fiber 18 by an appropriate amount in a manner set forth hereinbelow. It should be realized that it is considered an important inventive feature to realize that the reflections must be removed from the input beams entering ends A and B of fiber 18 of rotation sensor 10 rather than from the output beams exiting ends A and B of fiber 18, in order to produce satisfactory results.

In order to eliminate the reflections referred to hereinabove, reference is now made to FIG. 2 of the drawing for a clear illustration of the angular design of fiber ends A and B. Since fiber ends A and B are identical, FIG. 2 only illustrates end A, however, it should be realized both ends A and B are beveled identically. Each end face (illustrated as A in FIG. 2) of fiber 18 is lapped and polished such that its normal 40 makes an angle of 29' with the axis 42 of fiber 18. The axis 44 of the beam traveling into fiber 18 from outside or exiting from fiber 18, is at an angle of 16° to the fiber axis 42. The axis 46 of the reflected waves 48 produced at the fiber/air interface makes an angle of 90° with the axis 44 of the input beam. The axis 44 of the beam entering of exiting fiber 18 makes an angle of 45° with normal 40 to the fiber end A. This angle is close to the 56% Bragg angle value for fiber 18 and very well within the broad transparent range in the vicinity of the Brewster angle.

For actual fiber lapping the section of fiber 18 near the ends A and B can be bonded into a small diameter capillary whose internal diameter approximately matches the outer diameter of the fiber cladding, and this capillary is in turn bonded into a tube whose outer diameter is easily handled for lapping and polishing to the proper angle as specified above. The entire assembly is mounted in a holder (not shown) which allows the fiber ends A and B to be adjusted in location and orientation, and holds couplers 30 and 32 at the correct angle with respect to the fiber axis 44.

Although this invention has been described with reference to a particular embodiment, it will be understood to those skilled in the art that this invention is also capable of further and other embodiments within the spirit and scope of the appended claims.

We claim:

1. In a fiber optic rotation sensor having an electromagnetic source of energy for providing a beam of electromagnetic radiation, means optically aligned with said electromagnetic beam for dividing said beam of electromagnetic radiation into a first and a second beam of electromagnetic radiation, a fiber optic loop having a first and a second end, said first and said second ends of said fiber optic loop being optically aligned with said first beam and said second beam of electromagnetic radiation, respectively, means optically aligned with said first beam and said second beam of electromagnetic radiation for coupling said first beam and said second beam of electromagnetic radiation to said fiber optic loop and a detector optically aligned with sampled beams of electromagnetic radiation received from said fiber optic loop ends for measuring the instantaneous relative phase shift between said first beam and said second beam and providing an output representative of the rotation of said sensor, the improvement therein comprising: means interposed between said coupling means and said dividing means and in optical alignment with said first beam and said second beam of electromagnetic radiation, respectively, for passing the co-polarized waves of said first beam and said second beam therethrough while rejecting the cross-polarized waves of said beams in order for said fiber optic loop to act as a reciprocal element and render said output so as to be unaffected by surrounding environmental conditions; and means associated with said first end and said second end of said fiber optic loop for substantially preventing back reflections produced at each end thereof by said first beam and said second beam from reaching said detector.

2. The improved fiber optic rotation sensor of claim 1 wherein said co-polarized waves passing means is in the form of a polarization filter.

3. The improved fiber optic rotation sensor of claim 1 wherein said co-polarized wave passing means comprises a first and a second polarization filter, said first polarization filter being interposed within the optical path of said first beam of electromagnetic radiation and said second polarization filter being interposed within the optical path of said second beam of electromagnetic radiation.

4. The improved fiber optic rotation sensor of claim 1 wherein said means for preventing reflections produced at each end of said optic fiber loop from reaching said detector comprises a preselected angular configuration of each of said ends of said fiber optic loop.

5. The improved fiber optic rotation sensor of claim 4 wherein said angular configuration is defined such that the normal to each of said ends makes an angle of approximately 29° with the axis of said fiber and said axis of said respective beam of electromagnetic radiation adjacent said respective and makes an angle of approximately 16° with said fiber axis.

6. The improved fiber optic rotation sensor of claim 5 wherein said co-polarized wave passing means comprises a first and a second polarization filter, said first polarization filter being interposed within the optical path of said first beam of electromagnetic radiation and said second polarization filter being interposed within the optical path of said second beam of electromagnetic radiation.

7. In a fiber optic rotation sensor having an electromagnetic source of energy for providing a beam of electromagnetic radiation, means optically aligned with said electromagnetic beam for dividing said beam of electromagnetic radiation into a first and a second beam of electromagnetic radiation, a fiber optic loop having a first and a second end, said first and said second ends of said fiber optic loop being optically aligned with said first beam and said second beam of electromagnetic radiation, respectively, means optically aligned with said first beam and said second beam of electromagnetic radiation for coupling said first beam and said second beam of electromagnetic radiation to said fiber optic loop and a detector optically aligned with sampled beams of electromagnetic radiation received from said fiber optic loop ends for measuring the instantaneous relative phase shift between said first beam and said second beam and providing an output representative of the rotation of said sensor, the improvement therein comprising: means interposed within the optical paths of both said beam emanating from said electromagnetic source and said sampled beams for passing the co-polarized waves of said beam emanating from said source and said sampled beams therethrough while rejecting the cross-polarized waves of said beam emanating from said source and said sampled beams in order for said fiber optic loop to act as a reciprocal element and render said output of rotation unaffected by surrounding environmental conditions; and means associated with said first end and said second end of said fiber optic loop for substantially preventing back reflections produced at each end thereof by said first beam and said second beam from reaching said detector.

8. The improved fiber optic rotation sensor of claim 7 wherein said means for preventing reflections, produced at each end of said fiber optic loop, from reaching said detector comprises a preselected angular configuration of each of said ends of said fiber optic loop.

9. A method of rendering a fiber optic rotation sensor substantially insensitive to environmental effects, wherein said fiber optical rotation sensor includes a detector, a fiber optic loop having a pair of ends, a pair of beams of electromagnetic radiation being input into said pair of ends, respectively, and a pair of sampled beams being output from said pair of ends, respectively, said method comprising the steps of: interposing polarizing means within the optical path of said input beams and said output beams; causing said fiber optic loop to act as a reciprocal element by passing co-polarized waves of said input beams and said output beams through said polarizing means while rejecting said cross-polarized waves of said input beams and said output beams; and substantially preventing back reflections produced at said ends of said fiber optic loop by said input beams entering said ends of said fiber optic loop from being received by said detector.

* * * * *